Feb. 22, 1949.   G. B. KAHRES ET AL   2,462,404
TRACTOR TRAILER
Filed Dec. 26, 1945   2 Sheets-Sheet 1
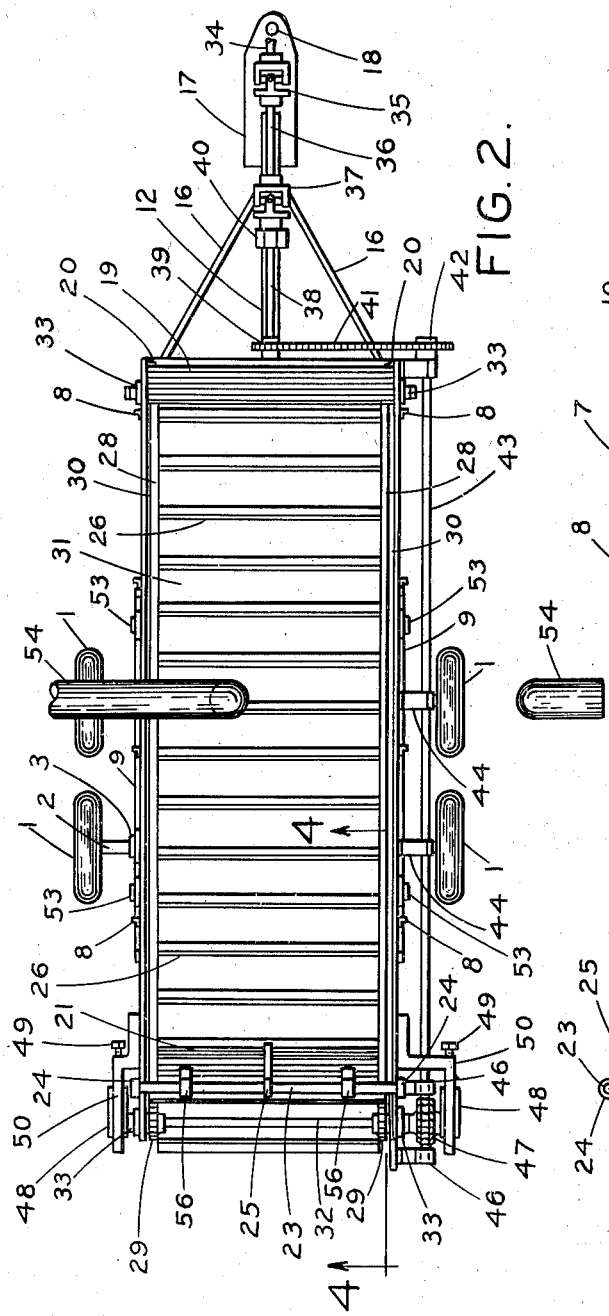
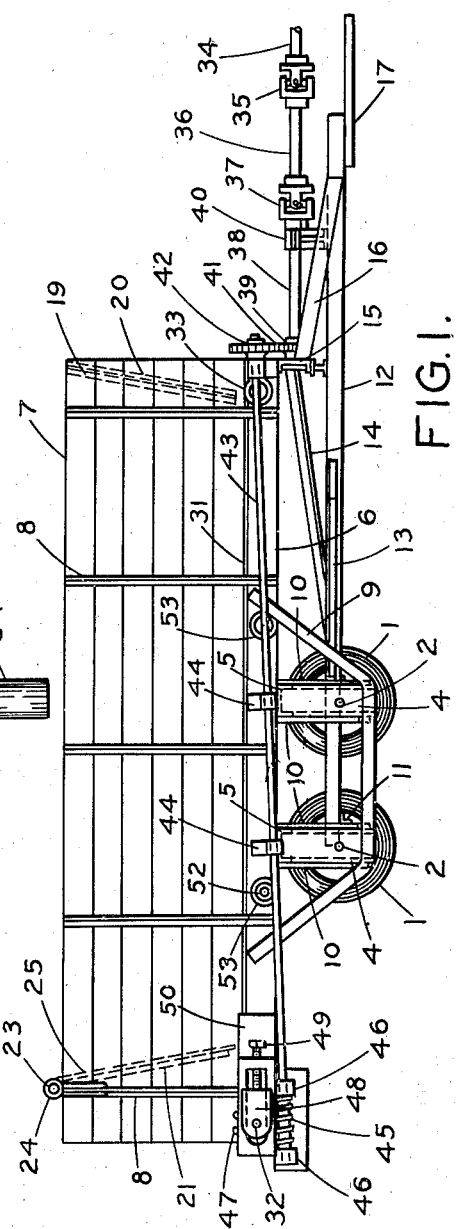
George B. Kahres &
Martin H. Kahres
Inventors
By *Samuel H. Davis*
Attorney

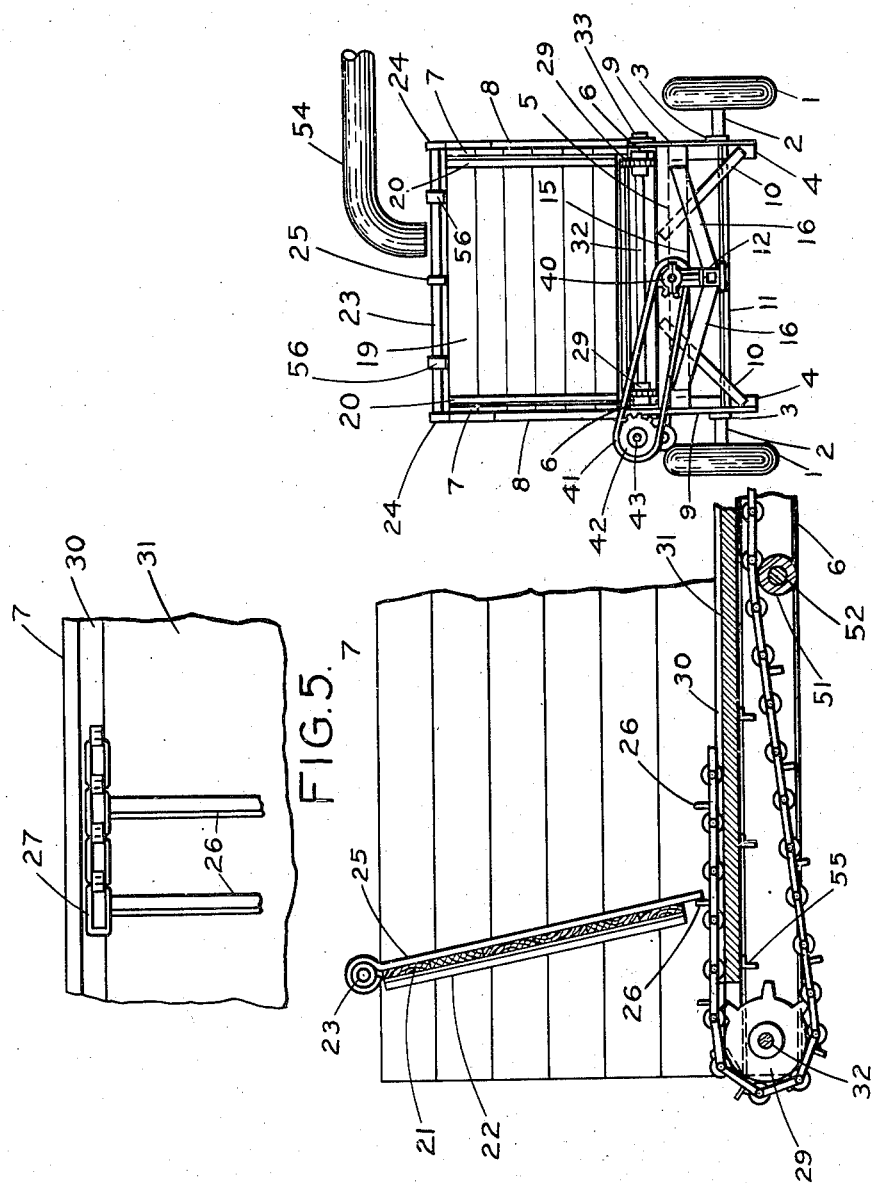

Patented Feb. 22, 1949

2,462,404

UNITED STATES PATENT OFFICE 2,462,404

TRACTOR TRAILER

George B. Kahres and Martin H. Kahres, Lansing, Mich.

Application December 26, 1945, Serial No. 637,150

2 Claims. (Cl. 214—83.18)

This invention relates to the class of agricultural machinery—it is a trailer to be coupled to a farm tractor and filled in the field with chopped hay, chopped corn ensilage or other chopped crops. The crops are harvested, chopped and blown into this tractor by a suitable field harvester or other similar machine.

Referring to figures of the drawings accompanying and forming a part of this application:

Fig. 1 is a side view of the trailer with the wheels on the near side removed to show the underframe.

Fig. 2 is a top view of the trailer.

Fig. 3 is a front view of the trailer, the power take-off and the tractor coupling devices being omitted.

Fig. 4 is a partial sectional view taken along 4—4 of Fig. 2.

Fig. 5 is a partial top view of Fig. 4, specifically to show the connection between the side angle irons and chain links.

Throughout the drawings and description the same number is used to refer to the same part.

In Figs. 1, 2 and 3 the trailer is shown mounted on wheels 1 and axles 2. The axles 2 rotate on bearings 3 which are secured to channel irons 4 and cross bed channel irons 5.

U-shaped channel iron frames, vertical channels 4 and cross bed channels 5 are best shown in Figs. 1 and 3. Frames 4 are welded to side channel irons 6, Figs. 1 and 3. A wood box frame 7 is built upon channels 6. Angle irons 8 are bolted to the box frame 7 and are welded to channel frames 6. Steel braces 9 are welded to channel frames 6 and to the bottom of channel frame 4, Figs. 1, 2 and 3. Knee braces 10 are welded to the cross bed channels 5 and vertical channels 4, Figs. 1 and 3. Angle irons 11 are welded to the vertical channels 4, Figs. 1 and 3. A long tongue piece 12 is welded to angle irons 11. Angle irons 13, Fig. 1, are welded to parts 4 and 12. Stiffener angle irons 14, Fig. 1, are welded to part 12 and front channel support 15. Stiffener bars 16 are welded to parts 15 and 12, Figs. 1, 2 and 3. A tractor coupling plate 17 is welded to part 12 and is provided with a hole 18 for a coupling pin not shown. The wood box frame 7 has a front closure 19 which is bolted to part 7 by angle irons 20, Figs. 1, 2, and 3. Part 7 is provided with a rear vertical swinging gate 21, Figs. 1, 2 and 4.

Angle irons 22, Fig. 4 are bolted to the several wood boards of gate 21. Part 21 is free to rotate about a pipe 23 on hinges 56, Fig. 2. Part 23 is supported at its two ends by parts 24, Figs. 1, 2, 3 and 4. A steel catch bar 25, Figs. 1, 2, 3 and 4, also rotates about part 23 and is secured to the several boards of part 21 by bolts. Part 25 rests against any one of angle irons 26, Figs. 2 and 4, which may be in position. Parts 26 are welded to the links 27, Figs. 4 and 5, of the endless chain belts 28, Fig. 2, which fit on sprocket 29, Figs. 2, 3 and 4. Parts 28 slide in shallow grooves 30 of the bed plate 31, Figs. 2, 4 and 5. Shafts 32, Figs. 3 and 4, are supported by bearings 33, Figs. 1, 2 and 3. Part 31 is supported by angle irons 55 which are welded to part 6.

Power is taken from the tractor, not shown, through shaft 34, Figs. 1 and 2, thence through the universal joint 35, shaft 36, universal joint 37, shaft 38 to sprocket 39, Figs. 1 and 2. The right end of shaft 38 is supported by the bearing 40, Figs. 1, 2, 3. The left end is supported by the front channel support 15. A chain belt 41 connects sprocket 39 and sprocket 42 which is mounted to shaft 43, Figs. 1, 2 and 3. Brackets 44, Figs. 1 and 2, support the shaft 43 at intermediate points. A worm 45 is secured to the left end of shaft 43 which is supported by brackets 46. The worm 45 meshes with a worm wheel 47 which is secured to rear shaft 32, Figs. 1 and 2. A wear take up frame is provided by parts 48, 49 and 50. Parts 50 are welded to the side channel irons 6. As mentioned above sprockets 29 are mounted on rear shaft 32 with the endless chain belt 28 meshing with sprockets 29. Intermediate supports for the endless chain belt 28 are provided by wheels 51, Fig. 4, at 52, Fig. 4, and bearings 53, Fig. 2. A feed pipe 54, Figs. 1, 2 and 3, leads from the "Papec" field harvester or similar machine to the wood box frame 7.

Operation.—The field harvester is driven in the field along side of the trailer. Power is shut off from the tractor, not shown, to the shaft 34 bringing parts 35, 36, 37, 38, 39, 40, 41, 42, 43, 45, 47, 29 and 26 to rest, with the steel bar 25 resting against one of the angle irons 26. With these at rest, the tractor pulling the trailer and the tractor pulling the field harvester are started up and down the field harvesting, chopping or shredding. The chopped or shredded field crops are blown by the fan of the harvester through the pipe 54 into the wood box 7. When the trailer is filled, the tractor pulls it to the silo.

Power is supplied from the tractor to the power take off shaft 34 setting in motion 35, 36, 37, 38, 39, 40, 41, 42, 43, 45, 47, 29 and 26. As parts 26 move to the rear of the trailer it moves the load against the rear gate 21 and catch bar 25 and swinging the rear gate 21 outward the load is then dumped into a box.

Having now described this invention, we claim:

1. A tractor trailer comprising in combination, a box body, said body having a continuous plate bottom, a wear take-up frame adjusting the taut of the said bottom said body provided with pivotal vertically arranged closures at the ends of the body, side chains provided with sprockets and axles carried by the said body, a power take off at the end of the said body constructed and arranged to take power from a tractor, the said power take off being provided with sprocket and chain connection devices whereby the said chains are operated, and the said side chains having spaced transverse angle irons arranged to sweep the said plate bottom of the said body and clear the said plate of chopped hay thereon, said body having supporting wheels and axles.

2. A tractor trailer comprising in combination a box body adapted to be moved about from place to place, said body having a continuous plate bottom, a wear take-up frame for adjusting the taut of the said bottom said body being provided with movable closures at the ends, side chains provided with sprockets and axles carried by the said body, a power take off at the end of the said body constructed and arranged to take power from a tractor, the said power take off being provided with sprocket and chain connection devices whereby the side chains are operated, and the said side chains having transverse angle irons connected therewith and arranged to sweep the said plate bottom of the said body when the side chains are operated and thereby clear the said body of chopped hay.

GEORGE B. KAHRES.
MARTIN H. KAHRES.

REFERENCES CITED

The following references are of record in the file of this patent:

UNITED STATES PATENTS

| Number | Name | Date |
|---|---|---|
| 1,328,709 | Burgess | Jan. 20, 1920 |
| 1,717,843 | Hollnagel | June 18, 1929 |
| 1,979,945 | Kranick | Nov. 6, 1934 |
| 2,139,162 | Jenkins | Dec. 6, 1938 |
| 2,166,135 | Fletcher | July 18, 1939 |
| 2,321,168 | Tognetti | June 8, 1943 |
| 2,340,983 | Pfeiffer et al. | Feb. 8, 1944 |
| 2,345,328 | Conway et al. | Mar. 28, 1944 |
| 2,405,534 | Voth | Aug. 6, 1946 |
| 2,426,980 | Ball | Sept. 9, 1947 |